J. T. CARROLL.
HOLLOW SLAB BUILDING STRUCTURE.
APPLICATION FILED OCT. 8, 1917.

1,274,987.

Patented Aug. 6, 1918.
3 SHEETS—SHEET 1.

WITNESSES
H. T. Walker
C. Bradway

INVENTOR
J. T. Carroll.
BY
ATTORNEYS

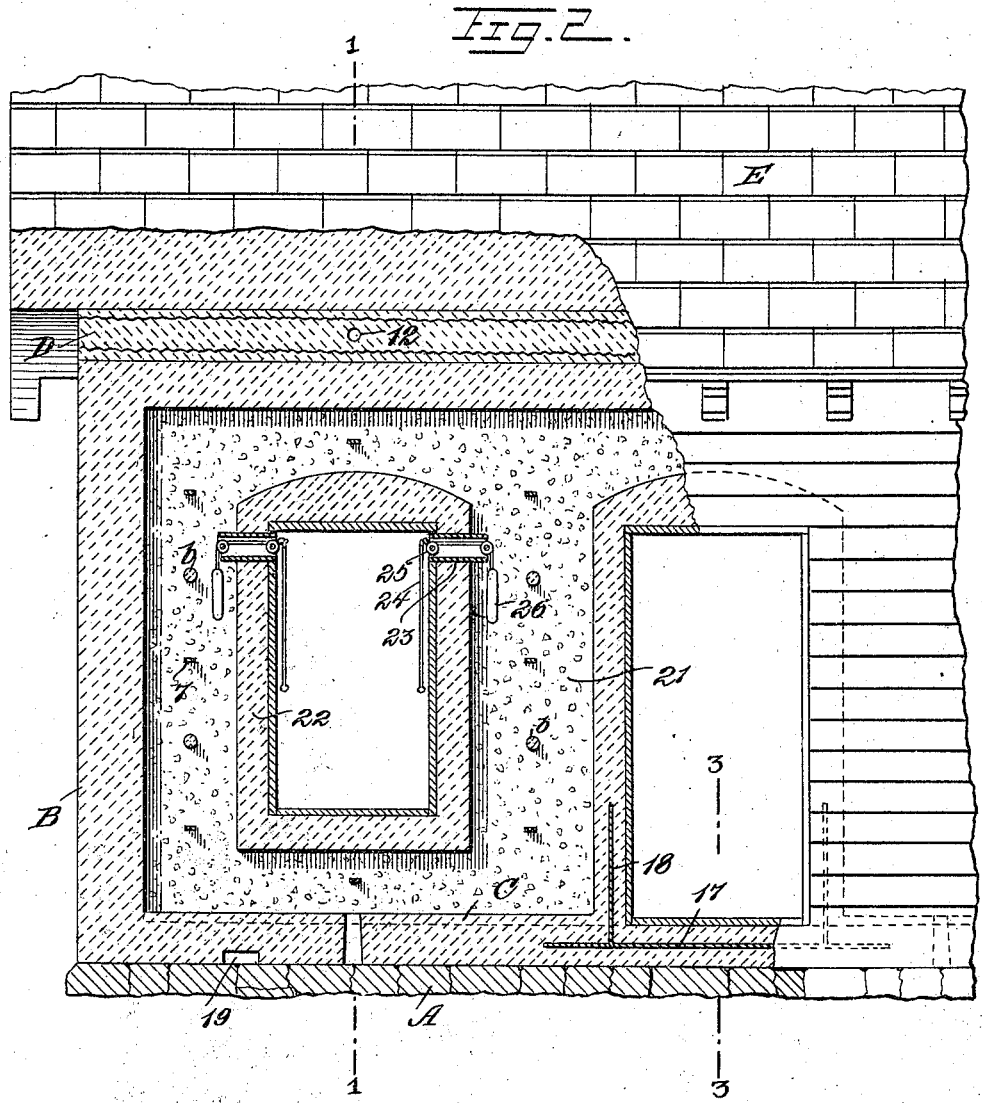
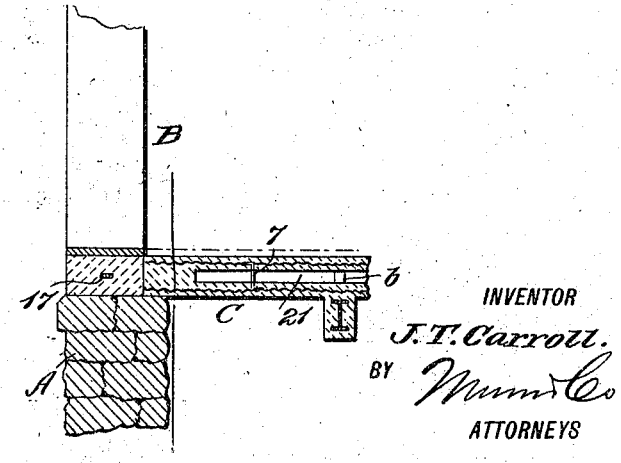

J. T. CARROLL.
HOLLOW SLAB BUILDING STRUCTURE.
APPLICATION FILED OCT. 8, 1917.
1,274,987.
Patented Aug. 6, 1918.
3 SHEETS—SHEET 3.
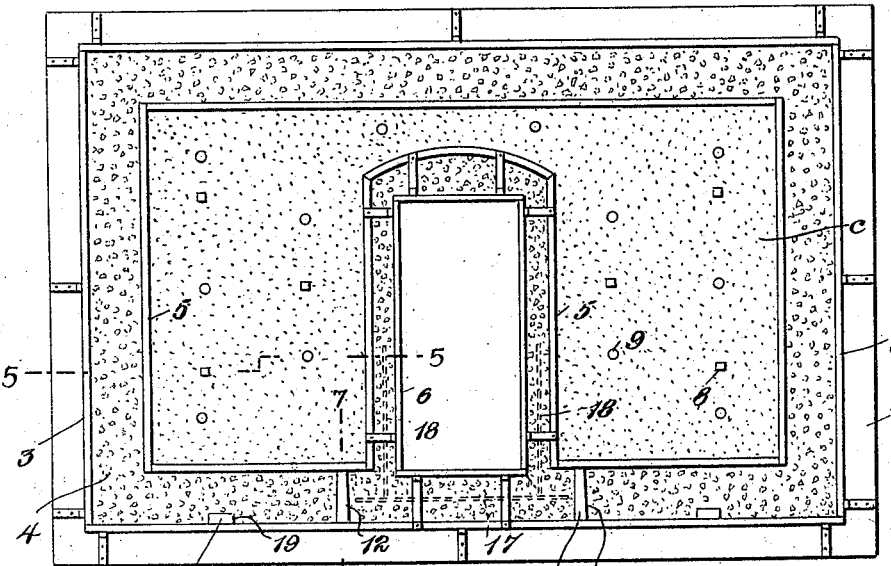
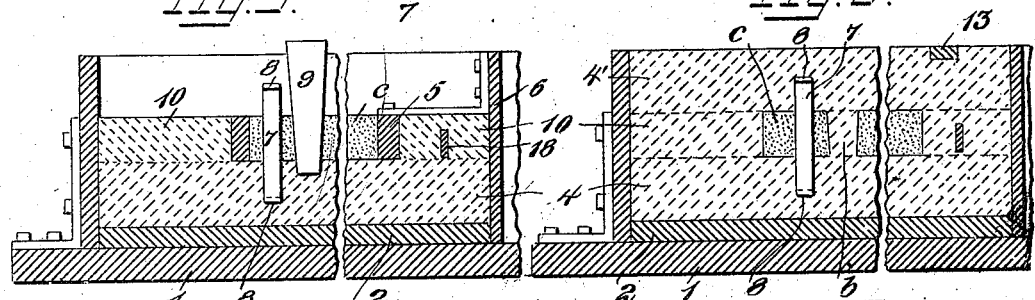
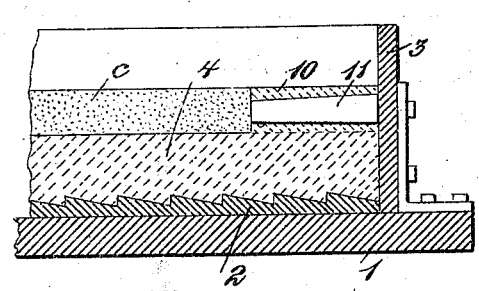
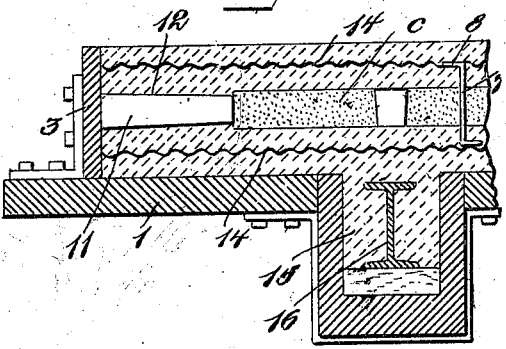
WITNESSES
H. J. Walker
O. Bradway
INVENTOR
J. T. Carroll.
BY
ATTORNEYS

UNITED STATES PATENT OFFICE.

JAMES T. CARROLL, OF BILLINGS, MONTANA.

HOLLOW-SLAB BUILDING STRUCTURE.

1,274,987.  Specification of Letters Patent.  Patented Aug. 6, 1918.

Application filed October 8, 1917. Serial No. 195,396.

*To all whom it may concern:*

Be it known that I, JAMES T. CARROLL, a citizen of the United States, and a resident of Billings, in the county of Yellowstone and State of Montana, have invented a new and Improved Hollow-Slab Building Structure, of which the following is a full, clear, and exact description.

This invention relates to concrete or cement gypsum buildings and has to deal more particularly with a novel construction of floor, wall, ceiling, roof or partition slab and the method of making the same.

The invention has for its general objects to improve the construction and method of manufacture of hollow slabs so that they can be made of any desired form or design in a simple, expeditious and inexpensive manner, and so constructed that the building structure made therefrom will have the advantage of being fireproof and practically indestructible, the walls, floors and ceilings being provided with a large dead air space which guards against the extremes of cold and heat and against moisture; and the slabs being of plastic material permit of artistic molds and forms being employed, which gives a pleasing appearance to the outside of the building, and furthermore, the outer and inner layers of the slab may be tinted to suit the builder's taste.

A more specific object of the invention is the provision of a hollow slab for the uses mentioned which has its air space made by the use of a sand core which is removed by being washed out under the action of a stream of water, the edges of the slab being closed at all points except that a plurality of openings are provided for the sand to be washed out, and furthermore, the slabs have integral or metal tie members for uniting the opposite faces of the slab, and the faces may be reinforced by embedded expanded metal or the equivalent, or by I or other beams, and the slabs for the walls of the building will have door or window frames molded therein and the outer surfaces of walls or of roof slabs may be molded to represent blocks, boards, shingles, tile or any other finish.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a vertical section of a building employing the improved slabs, the section being taken on the line 1—1, Fig. 2;

Fig. 2 is a side view of the building with a portion in section on the line 2—2, Fig. 1;

Fig. 3 is a detail sectional view on the line 3—3, Fig. 2, to show a door sill construction;

Fig. 4 is a plan view of the mold with a slab partially formed therein, which slab constitutes a wall of a room and has a door opening cast therein;

Fig. 5 is a detail sectional view on the line 5—5, Fig. 4, showing the slab partially formed in the mold;

Fig. 6 is a similar view showing the slab completely formed but before it is removed from the mold and the sand core washed out;

Fig. 7 is a detail sectional view on the line 7—7, Fig. 4; and

Fig. 8 is a sectional view of a mold adapted for making a slab having reinforcing beams.

Figure 1:
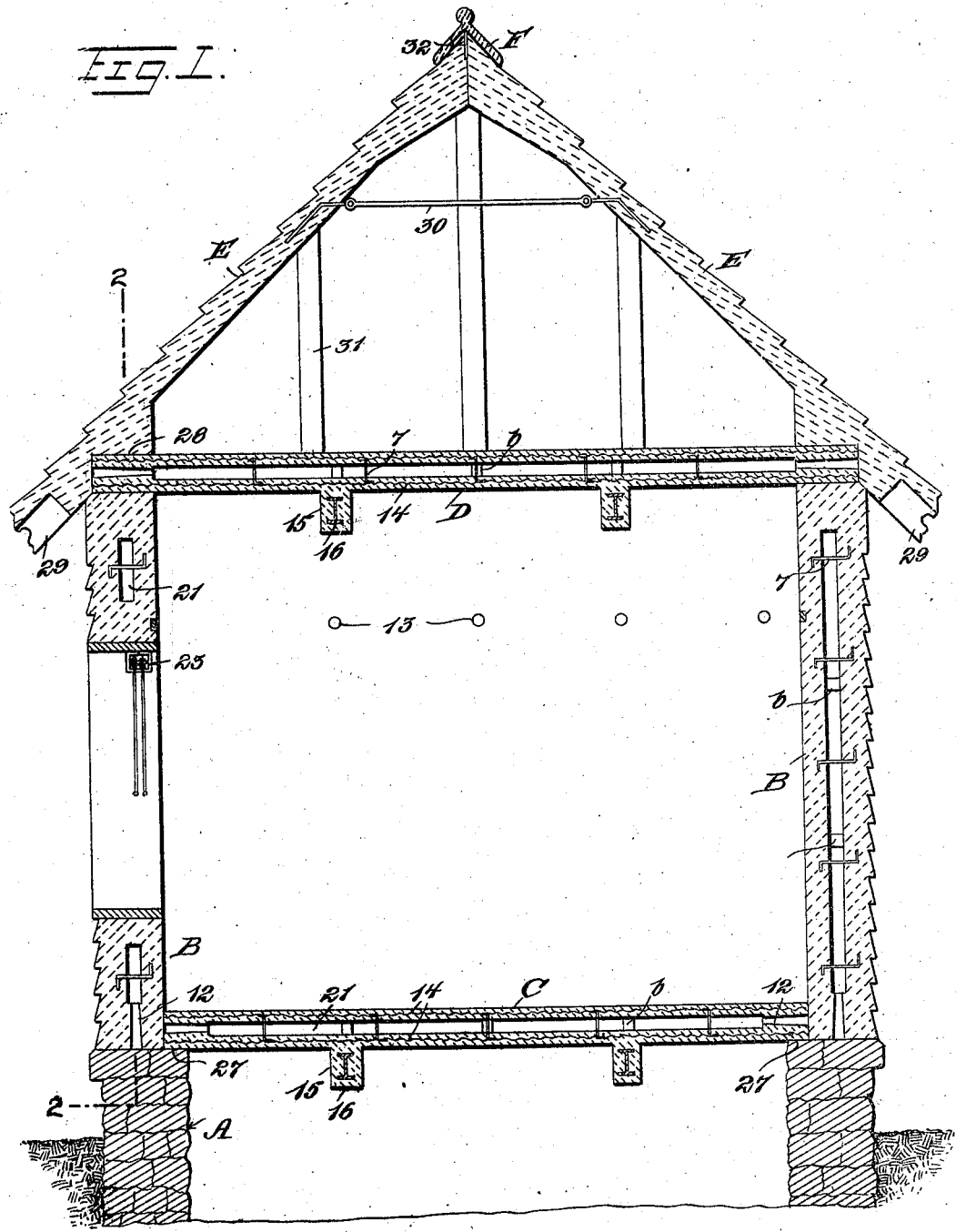

In connection with Figs. 4 to 8 of the drawings the construction of the slab will be described. The slabs are preferably rectangular with the edge or side surfaces at right-angles to the faces of the slab. The mold for casting the slab comprises a bottom plate 1 which may have a suitable molding pallet 2 placed thereon to give the outer or inner surface of the slab any desired surface shape to imitate any kind of wall surface, and suitably fastened to the bottom plate 1 are side walls 3. Into this mold is placed a layer of cement or concrete 4, as shown in Figs. 5 and 7, and if it is desired to tint the slab an initial layer of tinted concrete will be first supplied to the mold. After the first layer and before the concrete is set a supplemental mold is placed on the concrete, which mold is employed for forming the sand core *c*. This supplemental mold is composed of strips 5 which follow along the side walls 3 of the main mold in spaced and parallel relation thereto, and where a window or door opening is to be made in the slab, as shown in Fig. 4, the supplemental form of mold will follow along the door opening form or mold 5, which rests on the bottom plate 1. After the core form or mold 5 is set in place moist sand is filled into this form and firmly tamped. Metal tie members 7 having their ends formed into anchors 8 are passed through the sand core and embedded a few inches in the layer 4, with the upper ends of these tie elements projecting above the sand core. If desired, small blocks 9 may be embedded in the sand core, which blocks upon being removed provide passages in the sand core so that when the top layer of concrete is applied there will be integral bonds $b$ of concrete extending across the air chamber. After the sand core is made the form 5 is removed and a layer of concrete 10 is placed on the layer 4 while the latter is still soft. Before the layer 10 is filled in the space around the sand core a plurality of blocks 11 are interposed between the sand core and the outer wall of the mold, these blocks being in the form of wedges which are withdrawn at any desired time, so that openings 12 will be provided in the slab to permit the sand to be washed out after the slab is completed. Finally, another layer 4' of concrete is filled into the mold to cover the sand core and the layer 10. In other words, the space in the top of the mold shown in Figs. 5 and 7 is filled with concrete. The several layers of the concrete may be tamped or the slab may be compressed in a suitable power press, so that the slab will be solid at every point and devoid of air holes. Before the concrete sets wooden blocks 13 may be forced into the surface thereof, as shown in Fig. 6, so that picture rail strips can be nailed to the wall slab. If desired, expanded metal lathing or other reinforcing elements 14, Fig. 8, may be embedded in the first and final layer of the slab so as to lie parallel with the faces thereof, and when extra strength is required these slabs will be molded with longitudinal ribs 15 reinforced by I or other beams 16. A door sill is preferably provided with a longitudinal reinforcing bar 17, as shown in Figs. 2 and 4, which bar has upwardly extending members 18 which are embedded in the door jambs.

The walls or other slabs may be provided with recesses 19, Fig. 4, in the bottom edge, these recesses being formed by blocks 20 set in the mold, and the recesses provide for hoisting chains being applied around the slabs so that by the use of a derrick the slab can be set up into the proper place without the chain interfering, and when the slab is properly set up the chains can be readily detached by being pulled through the recesses. After the concrete of the slab is set and the molds or forms removed the sand is washed out by directing a high pressure stream of water into an opening 12, whereby the slab will have a closed air space or chamber 21, Figs. 1, 2 and 3, which air space will be crossed by the tie elements 7 and $b$.

At window openings the wall slab will have a window frame 22, Fig. 2, integral with the outer and inner walls of the air chamber 21, and in the window frame will be embedded sections of tubular tile 23 or the equivalent to form passages for the sash weight cords 24, there being guide rollers 25 for the cords, and the sash weights 26 will move up and down in the air chamber 21 without requiring any special guide boxes.

The foundation of the building has its walls slightly wider than the walls B of the building, so that ledges 27 will be formed to enable the edges of the floor slabs C to rest thereon. The ceiling slab D rests on the top of the wall slabs B, and the roof slabs E are molded with seats or shoulders 28 to engage with the ceiling slab. The lower edges of the roof slabs are molded with imitation rafters 29 to complete the single roof effect. The roof slabs are tied together by any suitable tie device 30, and post supports 31 may be employed between the ceiling and roof slabs. A ridge cap with concrete or other material is placed on the peak of the roof and is secured in place by anchoring lugs 32 clamped between the top edges of the roof slabs.

From the foregoing description taken in connection with the accompanying drawings, the advantages of the construction and method of operation will be readily understood by those skilled in the art to which the invention appertains, and while I have described the principle of operation, together with the structure which I now consider to be the best embodiment thereof, I desire to have it understood that the structure shown is merely illustrative and that such changes may be made when desired as fall within the scope of the appended claims.

Having thus described my invention, I claim as new and desire to secure by Letters Patent:

1. The method of making hollow slabs, which consists in placing a layer of plastic material in a mold, setting a form on the plastic material with the form spaced from the walls of the mold, producing a sand core in the form, removing the form, applying a passage-forming block between the sand core and a wall of the mold, completing the filling of the mold and covering the sand core with plastic material, removing the mold and also the passage-forming block, and washing out the sand core.

2. The herein-described method of making a slab with an air chamber, which consists in placing a layer of plastic material in a mold, setting up a form on the said layer, making a sand core in the said form, placing tie elements through the sand core with their lower ends embedded in the layer of plastic material and their upper ends projecting out of the core, removing the form, placing one or more passage-forming elements between the sand core and a wall of the mold, completing the filling of the mold with plastic material, removing the mold and the passage-forming elements, and washing out the sand core.

JAMES T. CARROLL.